May 29, 1934. A. H. MIDGLEY 1,960,449
ACOUSTIC APPARATUS
Filed Oct. 2, 1933 2 Sheets-Sheet 2

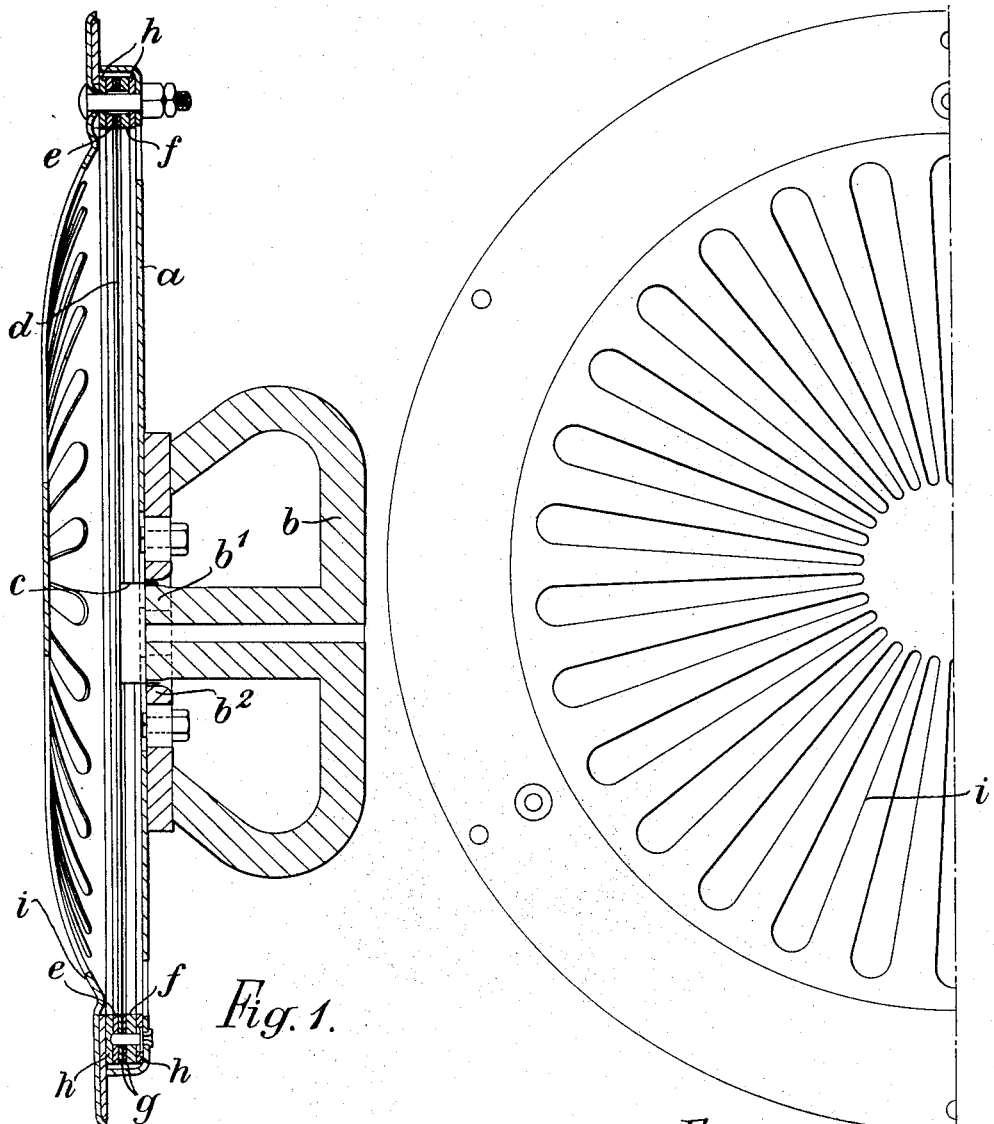

A. H. Midgley
INVENTOR

By: Marks & Clerk
Attys.

Patented May 29, 1934

1,960,449

UNITED STATES PATENT OFFICE 1,960,449

ACOUSTIC APPARATUS

Albert Henry Midgley, London, England

Application October 2, 1933, Serial No. 691,864
In Great Britain May 18, 1933

5 Claims. (Cl. 181—31)

The invention relates to telephone transmitters and receivers for reproducing or recording sound and is directed more particularly to electro-dynamic loud speakers of the type embodying a tensioned diaphragm or vibratory membrane, and a large baffle or horn in order effectively to load the diaphragm.

A thin tensioned diaphragm may vibrate in an infinite number of different modes each with its own particular frequency, which frequencies are very sharply defined. These frequencies are separated by smaller intervals as they become higher in the scale, and are relatively close together in any frequency range above the fundamental. Thus in the first three octaves above the fundamental frequency there are forty-four natural frequencies. Their position in the scale depends upon the size, thickness and material of which the diaphragm is made and their amplitude depends upon the damping effect of the air coupled to the diaphragm.

Attempts have previously been made to utilize this type of diaphragm for loud speakers. Diaphragms have been used tensioned to such a degree that the fundamental natural frequency is above the audible limit or high up in the audible scale and so that it is therefore impossible for the diaphragm in normal operation to vibrate in one of its nautral frequencies. This arrangement however does not reproduce satisfactorily the lower frequencies in the audible scale. In another form of loud speaker a highly stretched diaphragm having an inertia ring on its circumference has been employed in order to lower the motional impedance by increase the effective mass at low frequencies and thus to obtain a more even response. Highly tensioned diaphragms of very large diameter have also been used in order to obtain similar results.

The object of the present invention is to improve the arrangement and construction of such apparatus so that the response will be more uniform over the frequency range for which the apparatus is intended, and to attain this object in accordance with the present invention the main considerations to which attention is given are that the fundamental natural frequency of the diaphragm should be low down in the audible scale in order to obtain good response at low frequencies: that the effective mass of the diaphragm should be small in comparison with the mass of the operating coil in order to obtain good response at high frequencies: and that the mass of air coupled to the diaphragm should be large in comparison with that of the diaphragm and coil in order to obtain a large damping action to reduce the amplitude of the diaphragm at its natural frequencies while at the same time using a diaphragm of small diameter. Further the restoring force of the diaphragm should be directly proportional to the amount of the displacement.

The fundamental natural frequency of a diaphragm or vibratory membrane is proportional to $$\sqrt{\frac{s}{m}}$$

where $s=$ the stiffness or stretching force of the diaphragm and $m=$ the effective mass of the diaphragm and parts associated with it, including the mass of air coupled to the diaphragm.

So far as vibration in the fundamental mode is concerned the effective mass of the diaphragm per se can be taken as one third of the total mass of the diaphragm. The mass of the coil positioned at or near the centre of the diaphragm will materially increase this effective mass and thus lower the fundamental natural frequency of the diaphragm. The mass of coupled air will operate in the same way. Therefore since the effective mass of the diaphragm and coil is to be small in order to obtain good high frequency response the stiffness or tension of the diaphragm must be small in order that the fundamental frequency shall be low down in the audible scale, and the added mass of air must be large, in comparison with the mass of the diaphragm and coil, to provide the necessary damping at the natural frequencies of the diaphragm.

The present invention is based on the fact that by decreasing the mass and stiffness of the diaphragm so that the propagation velocity of transverse vibrational waves therein is a small part (say, approximately, one fifth) of the velocity of sound in air, and so that the mass of the operating coil becomes an important loading factor in the centre of the diaphragm, the fundamental natural frequency is brought low down in the audible scale. Further as the added mass of air coupled to the diaphragm becomes greater than the effective mass of the diaphragm and coil the resonant natural frequencies of the diaphragm are so reduced in amplitude that they are not noticeable to the ear and a more even frequency response is obtained.

The invention accordingly consists in a telephone transmitter or receiver comprising a tensioned diaphragm of thin material secured at its periphery, and of such mass and tension that the velocity of transverse vibrational waves therein is not greater than one quarter of that of sound waves in air.

The invention further consists in a telephone transmitter or receiver comprising a tensioned diaphragm of thin material substantially fixed at its periphery and provided with means at or near its centre for setting it into vibration, the effective mass of the said vibrational means being greater than one quarter of the weight of the diaphragm, and the diaphragm being so tensioned that the propagation velocity of transverse vibrational waves therein is less than one quarter of the velocity of sound in air.

Further features of the invention will be apparent from the description of one form thereof given hereafter.

The accompanying drawings illustrate one mode of carrying out the invention.

Figure 1 is a side sectional elevation of one form of loud speaker in accordance with the invention.

Figure 2 is a front elevation, and

Figure 3:
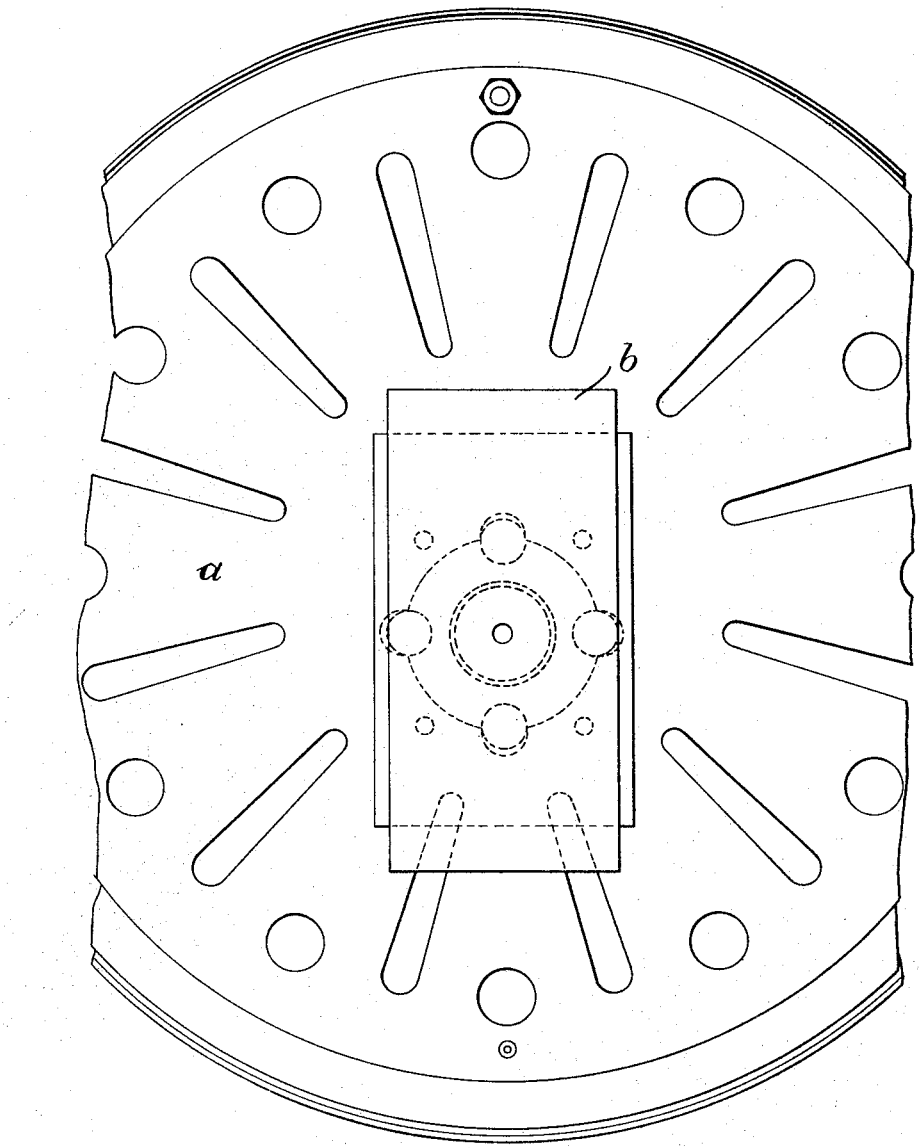
Figure 3 is a rear elevation.

In carrying my invention into effect in one convenient manner, as for example in its application to an electro-dynamic loud speaker, I provide a circular steel disc $a$ on one side of which is mounted at or near the centre a permanent or electro-magnet $b$ having a central pole $b'$ and an outer annular pole $b^2$ such that the operating coil $c$ may move in the space between the central pole face and the outer annular pole face, a hole being cut in the steel disc $a$ to allow the operating coil to pass through.

On the opposite side of the steel disc is fixed the diaphragm $d$ to which the operating coil $c$ is affixed.

The diaphragm consists of a thin tensioned aluminium sheet (say .00075 inch thick) held between two circular aluminium rings $e$ $f$ (e. g. 9 inches inside diameter) held together by rivets or screws. A ring $g$ of cork, cardboard or other material is placed between each aluminium ring and the circumferential face of the diaphragm in order to reduce the amplitude of the waves reflected from the circumferential edge of the diaphragm. Further I may place a ring $h$ of cork or felt between the diaphragm rings and the steel disc and outer steel stamping or cover plate $i$ in order to prevent the vibrations of the diaphragm from reaching the baffle board or horn.

The diaphragm may be fixed to the steel disc by means of screws or rivets passing through the aluminium rings so that the operating coil is free to move in the annular pole gap of the magnet. Holes are cut in the steel disc $a$ and cover plate $i$ opposite the diaphragm in order to release the air pressure each side of the diaphragm when operating.

The tension of the diaphragm is such that the propagation velocity of transverse vibration waves therein is less than one quarter the velocity of sound in air. I have found that one fifth the velocity of sound in air produces very good results. At this tension the restoring force is directly proportional to the amount of the displacement.

The operating coil $c$ preferably consists of a paper former (say .005 inch thick and 1 inch in diameter) wound with two layers of fine gauge aluminium wire (e. g. each layer of 50 turns).

In order that the diaphragm may be effectively loaded it is surrounded at its circumference by a baffle 3 feet square or it can be mounted at the throat of a horn, preferably one in which the cross-sectional area increases exponentially.

The weight of the vibrating diaphragm in one convenient form is 1.9 grams and the weight of the operating coil and former is .75 gram.

The weight of the added mass of air coupled to the diaphragm at low frequencies $$=\frac{16}{3}\cdot\rho R^3$$

where $\rho$=density of the air and R=radius of the diaphragm. For a 9 inch diameter diaphragm this equals 10.2 grams. At high frequencies this added mass of air becomes negligible. Therefore the total effective mass of the diaphragm varies from 11.58 grams at low frequencies to less than 1 gram at high frequencies thus ensuring good response both at low and high frequencies.

A loud speaker built in accordance with the above described invention gives a substantially uniform response over a wide range of audible frequencies and speech and music are reproduced more naturally than heretofore. It is, however, to be understood that the foregoing details are given by way of illustration and not of limitation of the scope of the invention since I may vary the means adopted for setting the diaphragm into vibration and the construction and arrangement of the various parts, depending upon the type or construction of apparatus to which the invention is to be applied, the purpose for which it is to be employed, or any practical requirements that may have to be fulfilled.

Having now described my invention, what I claim as new and desire to secure by Letters Patent is:—

1. A telephone transmitter or receiver comprising a tensioned diaphragm of thin material provided with operating means fixed at or near its centre, the effective mass of the said operating means being greater than one quarter of the weight of the diaphragm.

2. A telephone transmitter or receiver as claimed in claim 1 in which the tension of the diaphragm is such that the restoring force of the diaphragm is directly proportional to the amount of displacement.

3. A telephone transmitter or receiver as claimed in claim 1 in which the tension of the diaphragm is such that the velocity of transverse vibrational waves therein is not greater than one quarter of that of sound waves in air.

4. A telephone transmitter or receiver as claimed in claim 1 having a fixed frame to which the diaphragm is secured at its periphery and vibration absorbing material interposed between the diaphragm and said fixed frame.

5. A telephone transmitter or receiver as claimed in claim 1 having a fixed frame to which the diaphragm is secured at its periphery and material from the group containing cork and felt interposed between the diaphragm and the fixed frame.

ALBERT HENRY MIDGLEY.